No. 608,961. Patented Aug. 9, 1898.
W. R. FOX.
BICYCLE BEARING.
(Application filed Mar. 24, 1897.)
(No Model.)
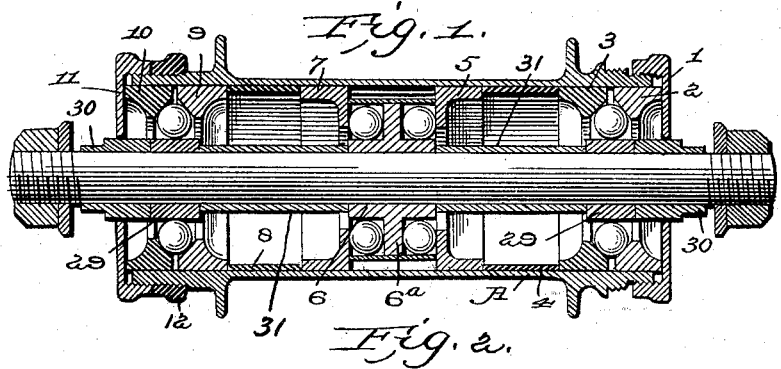
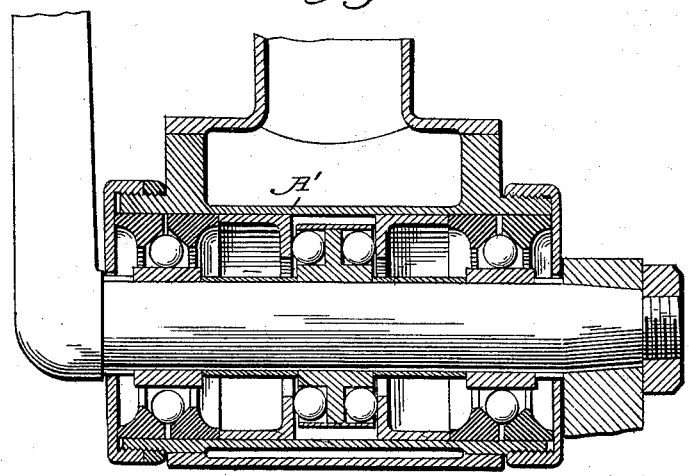
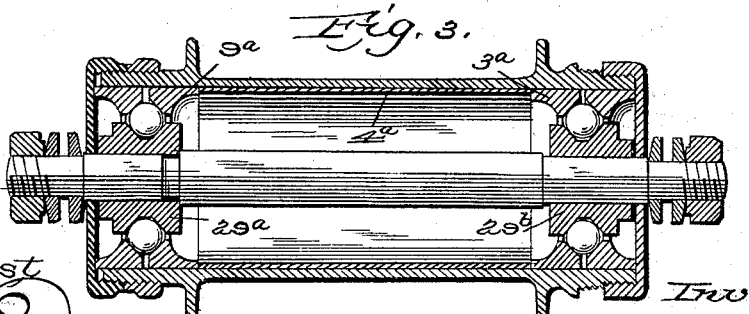
Attest
Wallen Maldson
James M. Spear
Inventor
William R. Fox
by Eric Spear
Atty.

UNITED STATES PATENT OFFICE.

WILLIAM R. FOX, OF GRAND RAPIDS, MICHIGAN, ASSIGNOR TO THE FOX MACHINE COMPANY, OF SAME PLACE.

BICYCLE-BEARING.

SPECIFICATION forming part of Letters Patent No. 608,961, dated August 9, 1898.

Application filed March 24, 1897. Serial No. 628,958. (No model.)

*To all whom it may concern:*

Be it known that I, WILLIAM R. FOX, a citizen of the United States, residing at Grand Rapids, in the county of Kent and State of Michigan, have invented certain new and useful Improvements in Bicycle - Bearings, of which the following is a specification, reference being had therein to the accompanying drawings.

My invention relates to improvements in ball-bearings designed more especially for bicycle-bearings; and the object of the invention is to provide a bearing in which the bearing surfaces or members may with greater ease be ground perfectly true, and, further, in which the necessary adjustment of all the bearings to take up wear may be made from one side.

A further object is to provide a bearing that will reduce the sliding action of the balls to a minimum.

The invention is illustrated in the accompanying drawings, in which—

Figure 1 is a sectional view of the rear hub of a bicycle containing my improved bearing. Fig. 2 is a similar view showing the invention applied to the crank shaft and hanger. Fig. 3 is a sectional view of a modified form of the invention, in which the side bearings act as thrust-bearings, and the central thrust-bearings of the other form are dispensed with.

Referring first to the form shown in Fig. 1, the hub A forms the shell or casing of the bearing. Upon the sprocket-wheel side, preferably, is threaded a cap 1, which bears against the outer part or section 2 of a two-part bearing-cup 2 3, the parts of which are movable in relation to each other. At the opposite end of the shell is a similar two-part bearing-cup 9 10, the inner part or member 9 of which is held or spaced a predetermined distance from the part 3 by suitable spacing means, (in the present form the sleeves and central thrust-bearing hereinafter described.) The cup member or part 10 is held in place and adjusted by a cap 11, threaded upon the end of the hub, which may be locked in any desired position by a locking-ring 12. The axle carries bearing members 29 29, between which and the two-part cups are located the antifriction-balls, as shown.

When it is necessary to adjust the bearing, the locking-ring being loosened, the screwing inward of the cap 11 will crowd the part 10 to the right and through the part 9 and spacing means the part 3 also, thus taking up the wear evenly upon both bearings, the plain surfaces of the bearing members 29 permitting the balls to accommodate themselves to this action. In this form I provide a central thrust-bearing which consists of a central bearing member 6, rigidly carried upon the axle and having an annular flange $6^a$, forming two ball-channels.

Movably mounted within the shell are the two bearing-rings 5 and 7, between which and the bearing member 6 $6^a$ the balls are located. Spacing-sleeves are provided between the rings 5 and 7 and the cup parts 3 and 9, as shown at 4 and 8.

The bearing members 29 are made removable from the axle and are held the required distance apart by the sleeves 31, abutting against the bearing 6. Sleeves 30 are provided, which enter the holes or slots in the rear forks and which bear against the members 29.

In Fig. 2 is shown this form applied to crank-hanger and axle, the hanger A' in this case forming the shell of the bearing.

In Fig. 3 is shown a modified form in which the central thrust-bearing is dispensed with. In this form the inner cup parts or members $3^a$ and $9^a$ are separated or spaced by a single sleeve $4^a$, the arrangement and adjustment of these parts being otherwise the same.

The bearing members $29^a$ and $29^b$ on the axle are provided with ball-channels shaped to form, with the two-part cups of the shell, four-point bearings. The bearing member $29^a$ is fixed to the axle, while the member $29^b$ is movable to allow for the adjustment.

Having described my invention, what I claim is—

1. A ball-bearing comprising the shell and axle, the load-supporting bearings, the thrust-supporting bearings, and means for simultaneously effecting the adjustment of all of said bearings from one end, substantially as described.

2. A ball-bearing comprising a shell, two-part bearing-cups located in the ends of said shell, bearing-rings intermediate of said cups, spacing means interposed between said rings and cups, said rings and cups being longitudinally movable within the shell, the axle, bearing members and balls in line with the two-part cups, a central bearing member carried by said axle, balls located between the central bearing member and the bearing-rings, and means for adjusting the bearings, substantially as described.

3. A ball-bearing comprising the shell, two-part bearing-cups located in the ends thereof, bearing-rings near the center of the shell, spacing means located between the cups and rings, said parts being movable longitudinally of the shell, the axle, bearing members carried thereby in line with the bearing-cups, balls located between the members and cups, the thrust-sustaining member carried by the axle, and balls located upon each side of said member between it and the bearing-rings, and means for adjusting said bearings, substantially as described.

4. In combination with the shell having the side bearing-cups and the central thrust-rings, the axle having a central thrust-bearing member rigidly carried thereby, side bearing members loosely mounted on said axle, the space-pieces located between said movable and immovable members, and the balls and means for adjusting said bearings, substantially as described.

5. In combination, the shell, the two-part cups, the central bearing-rings, the spacing-rings interposed between the rings and inner parts of the cups, said parts being movable, in relation to the shell, the holding and adjusting caps carried by the shell and bearing against the outer parts of the cups, the axle, the thrust member rigidly connected centrally thereof, balls between said thrust member and the bearing-rings of the shell, the removable bearing members concentric with the bearing-cups, spacing-pieces between said removable members and the central rigid member, the balls located between the said movable members and cups, substantially as described.

6. In combination with the shell and axle, the two-part bearing-cups movably carried by one of said parts, the bearing-rings also movably carried by said part, spacing means between said rings and cups, the bearing members having plain surfaces carried by the other part, the thrust-sustaining member rigidly carried by said other part, balls interposed between said bearing parts and means for simultaneously adjusting all the bearings from one end, substantially as described.

In testimony whereof I affix my signature in presence of two witnesses.

WILLIAM R. FOX.

Witnesses:
   JNO. DUFFY,
   FANNIE C. GORHAM.